M. MAUER.
WATER CLOSET TANK.
APPLICATION FILED MAR. 29, 1916.
1,188,089.
Patented June 20, 1916.
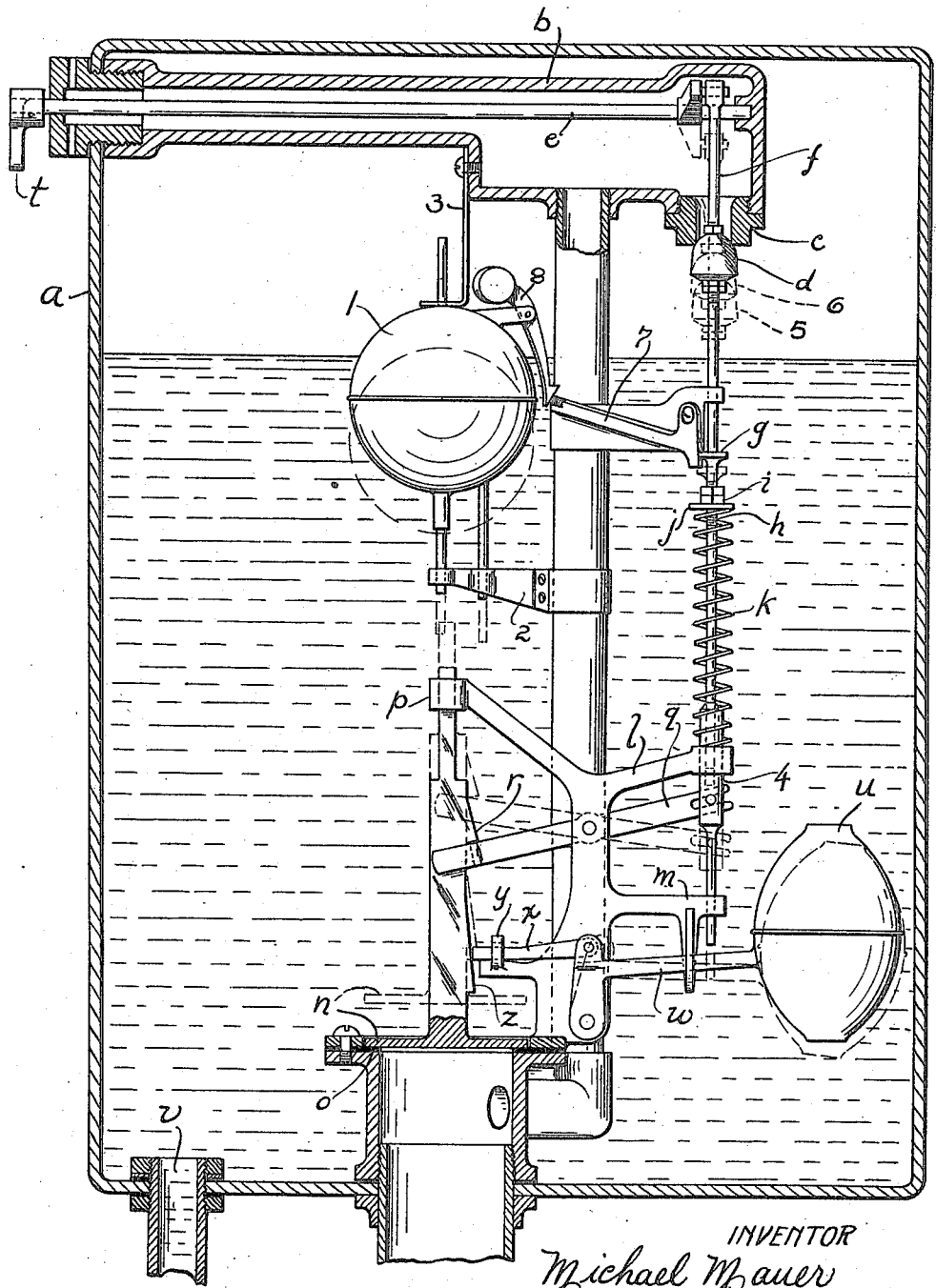
INVENTOR
Michael Mauer
BY Ralzemond A. Parker
ATTORNEY

UNITED STATES PATENT OFFICE.

MICHAEL MAUER, OF DETROIT, MICHIGAN.

WATER-CLOSET TANK.

1,188,089. Specification of Letters Patent. Patented June 20, 1916.

Application filed March 29, 1916. Serial No. 87,407.

*To all whom it may concern:*

Be it known that I, MICHAEL MAUER, a citizen of the United States, residing at Detroit, county of Wayne, State of Michigan, have invented a certain new and useful Improvement in Water-Closet Tanks, and declare the following to be a full, clear, and exact description of the same, such as will enable others skilled in the art to which it pertains to make and use the same, reference being had to the accompanying drawings, which form a part of this specification.

This invention relates to water closet-tanks and especially to water-closet tanks of that variety which is operated by an air valve, the tank being an air-tight inclosure so that opening of the air valve releases the air pressure in the tank and allows the inflow of water.

The invention consists in the arrangement of elements and the mechanism hereinafter to be described.

In the drawing, the view is a vertical cross section of a water-closet tank showing the apparatus in elevation.

$a$ designates a tank which is an air-tight inclosure; $b$ a tubular housing extending from the outside of the tank. In the threaded opening in the end of this tank is screwed the plug $c$ having a passage therethrough and affording a valve seat on its under side for the air valve $d$. The operating connections $e$ extend through the tubular housing $b$ and comprise a rocker shaft provided with a rocker arm and a depending valve stem $f$ upon which the air valve $d$ is carried. This valve stem $f$ continues down and is provided with a shoulder $g$ below the valve $d$ and still farther down it is threaded as at $h$ to secure the adjusting nut $i$ and its companion jam-nut which regulate the position of the spring abutment $j$ which holds one end of the spiral spring $k$ that is coiled about the valve stem. The opposite end of the coil spring engages one of the branches of the tree $l$ while the lower end of the valve stem $f$ reciprocates in the sleeve 4 which is guided in the end of the branch and also through the end of a second lower branch $m$.

The discharge of water from the tank is governed by the valve $n$ which seats upon the valve seat $o$. This valve is guided by reason of its stem passing through another branch of the tree $l$ at $p$. On the trunk of the tree $l$ is pivoted a rocking cross bar $q$, one end of which is bifurcated and straddles a pin on the sleeve 4. The opposite end is also bifurcated and ordinarily engages under a ratchet tooth $r$ of the discharge valve stem. Now, obviously when the rock shaft $e$ is rocked by the turning of the crank $t$ the air valve $d$ is opened as shown in dotted lines at 5 and simultaneously the discharge valve $n$ is raised. The air valve springs back to the position shown in the dotted lines at 6. The air pressure in the tank being relieved, the water readily flows in through the inflow pipe, which may be seated in the bottom of the tank as at $v$. The discharge valve being open, the water now freely flows out until it allows the dropping of the float $u$ which has fast to it an elbow $w$ pivoted at one end to the trunk of the tree and the elbow itself pivoting a free link $x$ which is guided in another branch $y$ of the tree $l$. Now, the end of this free link $x$ is ordinarily held under the ratchet tooth $z$ of the discharge valve stem when this valve is raised by the full opening of the inlet valve, as indicated at 5, and when the float $u$ is in the position of the full lines of the figure. This holds the discharge valve open. However, as soon as the water level drops the float $u$ to the position shown in the dotted lines, this free link is drawn out from engagement with the ratchet tooth and allows the descent of the discharge valve $n$ (for the valve stem in springing back to the position indicated at 6 has allowed the sleeve 4 and the cross bar to raise when the link $x$ is dragged out of engagement with the tooth 2 by the descent of the float $u$). This closes off the discharge of the tank. Consequently the tank immediately begins to fill. The water rises in the tank until it raises the upper float 1 which is suitably guided by a pair of guide pins in the arm 2 attached to the upright support which also serves as an overflow pipe. An upwardly extending pin guides the float in the bracket 3. Now, this float 1 carries a weighted trip lever 7 adapted to engage the weighted trigger 7. It will be readily understood that when the valve stem $f$ descends the T-head end of the trigger, by reason of the weighting at this trigger, swings above the shoulder $g$ and thereby retains the valve stem $f$ in its position indicated at 6 against the pressure of the spiral spring $k$. Now again referring to the rise of the water in the tank, it will be seen when this upper float 1 is caused to rise, it carries the weighted trip lever 7 up with it, and this being provided with a hook on its end, grabs the end of the weighted trigger 7 and pulls the T-head out of engagement with the shoulder $g$, thereby allowing the T-head to close the air valve, thus shutting off the escape of air. As soon as the water pressure equals the compression of the air the water ceases to flow into the tank.

What I claim is:

1. In a water tank, the combination of a container of air-tight construction, an air valve, a trigger for keeping the air valve open when the same has been opened, a discharge valve, connections between the air valve and the discharge valve so that when the air valve is opened the discharge valve is opened, a trigger device for keeping the discharge valve open, a float which when dropped pulls the trigger out of engagement with the discharge valve and allows the descent of the same, and a second float provided with a trip lever which disengages the trigger from the air valve when the water rises in the tank.

2. In a tank, the combination of an air-tight container, an air valve, an intake pipe, a trigger for holding the air valve open, a discharge valve, means for opening the air valve and discharge valve, a trigger device for keeping the discharge valve open, a float whose dropping removes the trigger device and drops the discharge valve, a second float whose rise disengages the trigger from the air valve, and a spring for closing the same.

3. In a tank, an air-tight container, an air valve, a discharge valve, triggers for keeping each open, means for opening each, and floats for closing each.

4. In a tank, an air-tight container, an air valve, a discharge valve, mechanism for opening each, means for keeping each open, and floats for operating said last-mentioned means for allowing the closure of each.

5. In a tank, an air-tight container, an air valve, a discharge valve, a vertical stem on each valve, means for opening the air valve, a pivoted cross bar for communicating the open movement of the air valve stem to the discharge valve stem, a suitably guided free link for engaging under a ratchet tooth on the discharge valve stem, a float for controlling the position of said link, a trigger adapted to swing in under a shoulder on the air valve stem, and a second float provided with a hooked trip lever which rises with the rise of the water and pulls the trigger out from engagement with the shoulder of the air valve stem.

6. In a tank, an air-tight container, a tubular housing extending thereinto, a rock shaft thereon provided with a rock arm on its end, a valve stem connected with said rock arm, a valve seat in the bottom of the end of the tubular housing, an air valve closing the same and secured to said valve stem, a spring for normally closing said air valve, a shoulder on the stem of the air valve, a trigger adapted to swing behind the shoulder when the valve stem is depressed by rocking the said rock shaft, a discharge valve provided with a vertical stem having a pair of ratchet teeth, a cross lever pivotally supported and having at one end a thrust engagement with the valve stem and at the opposite end engaging with one of the ratchet teeth of the discharge valve stem, whereby depressing of the air valve raises the discharge valve, a drag link engaging with the second ratchet tooth and engaging under the shoulder of the same when the discharge valve is raised, a float for keeping said link under the tooth when the water raises the float, and a second float carrying a trip lever adapted to hook under the trigger that engages the air valve stem shoulder to trip the same and allow the same to close the air valve when the water rises.

7. In a water-closet tank, the combination of an air-tight container, an air valve governing an air vent, a spring tending to seat the valve, means for holding the valve open to allow water to flow into the tank, and means for disengaging said last mentioned means to allow the spring to close the air valve when a predetermined water level has been reached.

8. In a water-closet tank, the combination of an air-tight container, an air valve governing an air vent, a spring tending to seat the valve, a trigger for holding the air valve open when opened, and a float for disengaging the trigger when a predetermined water level is reached.

9. In a water-closet tank, the combination of an air-tight container, an air valve governing an air vent, means for normally keeping the valve closed regardless of the water level in the tank, means for opening the valve against the resistance of the last mentioned means, a trigger for holding the air valve open, and a float for tripping the trigger and allowing the closure of the valve when a predetermined water level is reached.

In testimony whereof, I sign this specification.

MICHAEL MAUER.